US011736939B2

(12) United States Patent
Chu et al.

(10) Patent No.: US 11,736,939 B2
(45) Date of Patent: Aug. 22, 2023

(54) APPARATUS AND METHOD FOR MULTI-LINK MANAGEMENT IN MULTI-LINK COMMUNICATION SYSTEMS

(71) Applicant: NXP USA, Inc., Austin, TX (US)

(72) Inventors: Liwen Chu, San Ramon, CA (US); Young Hoon Kwon, Laguna Niguel, CA (US); Hongyuan Zhang, Fremont, CA (US); Hui-Ling Lou, Sunnyvale, CA (US)

(73) Assignee: NXP USA, Inc., Austin, TX (US)

( * ) Notice: Subject to any disclaimer, the term of this patent is extended or adjusted under 35 U.S.C. 154(b) by 113 days.

(21) Appl. No.: 17/138,814

(22) Filed: Dec. 30, 2020

(65) Prior Publication Data

US 2021/0211871 A1 Jul. 8, 2021

Related U.S. Application Data

(60) Provisional application No. 62/957,173, filed on Jan. 4, 2020, provisional application No. 62/957,162, filed on Jan. 4, 2020.

(51) Int. Cl.
| | |
|---|---|
| *H04L 29/00* | (2006.01) |
| *H04W 12/0433* | (2021.01) |
| *H04W 12/06* | (2021.01) |
| *H04W 80/02* | (2009.01) |
| *H04W 12/0431* | (2021.01) |

(52) U.S. Cl.
CPC ... *H04W 12/0433* (2021.01); *H04W 12/0431* (2021.01); *H04W 12/06* (2013.01); *H04W 80/02* (2013.01)

(58) Field of Classification Search
CPC ......... H04W 12/0433; H04W 12/0431; H04W 12/06; H04W 80/02
USPC ......................................................... 726/26
See application file for complete search history.

(56) References Cited

U.S. PATENT DOCUMENTS

| | | | |
|---|---|---|---|
| 2002/0087716 A1* | 7/2002 | Mustafa | H04L 9/40 |
| | | | 709/236 |
| 2018/0206143 A1* | 7/2018 | Patil | H04L 65/70 |
| 2021/0051574 A1 | 2/2021 | Chu et al. | |

* cited by examiner

*Primary Examiner* — Brandon Hoffman
*Assistant Examiner* — Michael D Anderson

(57) ABSTRACT

Embodiments of an apparatus and method are disclosed. In an embodiment, a method of executing multi-link operations in a multi-link communications system comprises performing a single frame exchange between a first multi-link device and a second multi-link device to execute a multi-link operation for multiple links between the first and second multi-link devices using a frame transmitted on a first link among the multiple links, wherein the frame includes an element that carries other link information on at least one link of the multiple links other than the first link, wherein the frame includes per-link value information that has different values for different links of the multiple link, and wherein successful execution of the single frame exchange completes the multi-link operation for at least two links of the multiple links between the first and second multi-link devices.

20 Claims, 11 Drawing Sheets

| ELEMENT ID | LENGTH | ELEMENT ID EXTENSION | INFORMATION | ADDED FIELD - RELATED LINK INFORMATION |
|---|---|---|---|---|
| 402 | 404 | 406 | 408 | 520 |

FORMAT FOR ELEMENT WITH OTHER LINK INFORMATION

APPARATUS AND METHOD FOR MULTI-LINK MANAGEMENT IN MULTI-LINK COMMUNICATION SYSTEMS

CROSS-REFERENCE TO RELATED APPLICATIONS

This application is entitled to the benefit of U.S. Provisional Patent Application Ser. No. 62/957,162, filed on Jan. 4, 2020 and U.S. Provisional Patent Application Ser. No. 62/957,173, filed on Jan. 4, 2020, which are incorporated herein by reference.

BACKGROUND

In multi-link communications, multi-link devices, e.g., access point (AP) multi-link devices (MLDs) or non-AP MLDs, can execute various multi-link operations, such as negotiations and announcements of some features or operations for communication links between the multi-link devices. As an example, security key negotiations can be executed between an AP MLD and a non-AP MLD for multiple links between the two MLDs. However, when there are multiple links involved in the multi-link operations, there is a need to efficiently execute the multi-link operations.

SUMMARY

Embodiments of an apparatus and method are disclosed. In an embodiment, a method of executing multi-link operations in a multi-link communications system comprises performing a single frame exchange between a first multi-link device and a second multi-link device to execute a multi-link operation for multiple links between the first and second multi-link devices using a frame transmitted on a first link among the multiple links, wherein the frame includes an element that carries other link information on at least one link of the multiple links other than the first link, wherein the frame includes per-link value information that has different values for different links of the multiple link, and wherein successful execution of the single frame exchange completes the multi-link operation for at least two links of the multiple links between the first and second multi-link devices.

In an embodiment, the other link information carried in the element includes link identifier of the at least one link of the multiple links other than the first link.

In an embodiment, the element is an extensible element and wherein the other link information is carried in at least one added field or subelement of the element.

In an embodiment, the element is a Per STA Profile element that includes the other link information.

In an embodiment, the Per STA Profile element includes multiple subelements and fields before the multiple subelements.

In an embodiment, the Per STA Profile element has a particular format among different formats based on different values in a type field.

In an embodiment, the Per STA Profile element includes a type field that identifies one of different formats for the Per STA Profile element.

In an embodiment, the multi-link operation is a key negotiation of a fast basic service set (BSS) transition.

In an embodiment, the key negotiation is based on a key hierarchy for fast BSS transition.

In an embodiment, the key negotiation includes a pairwise transient key (PTK) negotiation based on a non-access point's media access control (MAC) service access point (SAP) address, a MAC SAP address of a current associated access point (AP) multi-link device and a MAC SAP address of a transmitting AP MLD.

In an embodiment, the single frame exchange excludes frame exchanges involving management frames of sounding, fast session transfer (FST) and public action In an embodiment, a multi-link communications system comprises a first multi-link device, a second multi-link device, and a plurality of links connecting the first and second multi-link devices, wherein the first and second multi-link devices are programmed to perform a single frame exchange to execute a multi-link operation for multiple links between the first and second multi-link devices using a frame transmitted on a first link among the multiple links, wherein the frame includes an element that carries other link information on at least one link of the multiple links other than the first link, wherein the frame includes per-link value information that has different values for different links of the multiple link, and wherein successful execution of the single frame exchange completes the multi-link operation for at least two links of the multiple links between the first and second multi-link devices.

In an embodiment, the other link information carried in the element includes link identifier of the at least one link of the multiple links other than the first link.

In an embodiment, the element is an extensible element and wherein the other link information is carried in at least one added field or subelement of the element.

In an embodiment, the element is a Per STA Profile element that includes the other link information.

In an embodiment, the Per STA Profile element has a particular format among different formats based on a management frame that carriers the Per STAT Profile element or wherein the Per STA Profile element includes a type field that identifies one of the different formats for the Per STA Profile element.

In an embodiment, the multi-link operation is a key negotiation of a fast basic service set (BSS) transition.

In an embodiment, a multi-link device of a multi-link communications system comprises a processor configured to perform a single frame exchange with another multi-link device of the multi-link communications system to execute a multi-link operation for multiple links between the multi-link device and the another multi-link device using a frame transmitted on a first link among the multiple links, wherein the frame includes an element that carries other link information on at least one link of the multiple links other than the first link, wherein the frame includes per-link value information that has different values for different links of the multiple link, and wherein successful execution of the single frame exchange completes the multi-link operation for at least two links of the multiple links between the multi-link device and the another multi-link device.

In an embodiment, the other link information carried in the element includes link identifier of the at least one link of the multiple links other than the first link.

In an embodiment, the element is a Per STA Profile element that includes the other link information, and wherein the Per STA Profile element has a particular format among different formats based on a management frame that carriers the Per STAT Profile element or wherein the Per STA Profile element includes a type field that identifies one of the different formats for the Per STA Profile element.

Other aspects in accordance with the invention will become apparent from the following detailed description, taken in conjunction with the accompanying drawings, illustrated by way of example of the principles of the invention.

BRIEF DESCRIPTION OF THE DRAWINGS

FIG. 5A shows a format for an element with other link information used in the multi-link communications system in accordance with one embodiment of the invention.

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
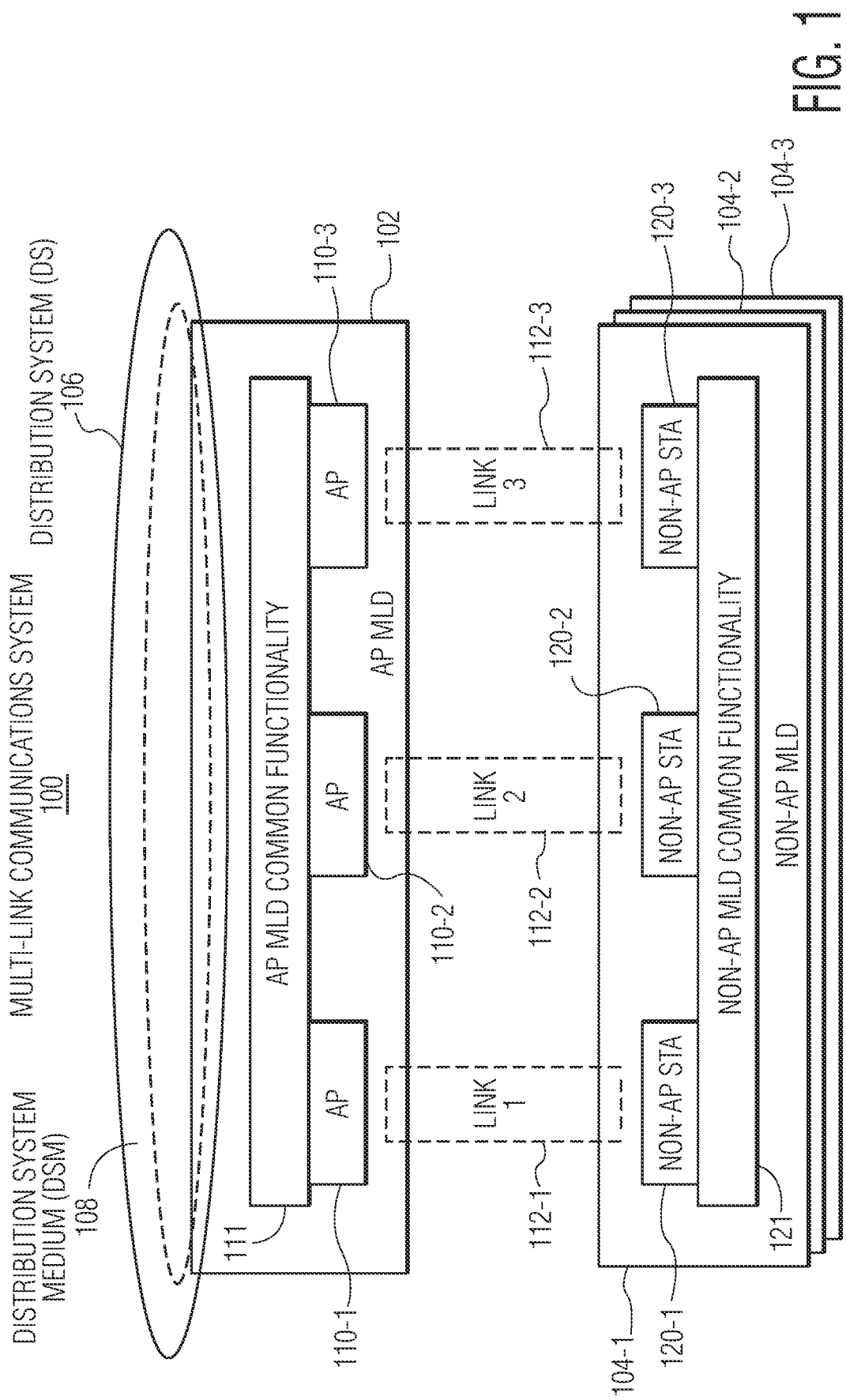
FIG. 1 depicts a multi-link communications system in accordance with an embodiment of the invention.

FIG. 1 depicts a multi-link communications system 100 in accordance with an embodiment of the invention. In the embodiment depicted in FIG. 1, the multi-link communications system includes at least one AP (MLD) 102, and multiple non-AP MLDs 104-1, 104-2, 104-3. The multi-link communications system can be used in various applications, such as industrial applications, medical applications, computer applications, and/or consumer or appliance applications. In some embodiments, the multi-link communications system is a wireless communications system, such as a wireless communications system compatible with an Institute of Electrical and Electronics Engineers (IEEE) 802.11 protocol. For example, the multi-link communications system may be a wireless communications system compatible with an IEEE 802.11be protocol. In some embodiments, the multi-link communications system includes one or more AP MLDs and/or one or more non-AP MLDs. Although the depicted multi-link communications system 100 is shown in FIG. 1 with certain components and described with certain functionality herein, other embodiments of the multi-link communications system 100 may include fewer or more components to implement the same, less, or more functionality. For example, in some embodiments, the multi-link communications system includes multiple AP MLDs, more than three non-AP MLDs, and/or less than three non-AP MLDs. In yet another example, although the multi-link communications system 100 is shown in FIG. 1 as being connected in a certain topology, the network topology of the multi-link communications system 100 is not limited to the topology shown in FIG. 1.

In the embodiment depicted in FIG. 1, the AP MLD 102 includes multiple APs 110-1, 110-2, 110-3, and one common entity 111. The APs implement the features related to the specific links, e.g., medium access and frame transmission/reception. The common entity 111 includes the features shared by all links (APs), e.g., non-AP MLD management, and reordering of the received data frames before transmitting them to the up layer. The APs 110-1, 110-2, 110-3 may be implemented in hardware (e.g., circuits), software, firmware, or a combination thereof. The APs 110-1, 110-2, 110-3 may be fully or partially implemented as an integrated circuit (IC) device. In some embodiments, the APs 110-1, 110-2, 110-3 are wireless APs compatible with at least one WLAN communications protocol (e.g., at least one IEEE 802.11 protocol). For example, the APs 110-1, 110-2, 110-3 may be wireless APs compatible with an IEEE 802.11be protocol. In some embodiments, an AP is a wireless AP that connects to a local area network (e.g., a LAN) and/or to a backbone network (e.g., the Internet) through a wired connection and that wirelessly connects to wireless stations (STAs), for example, through one or more WLAN communications protocols, such as an IEEE 802.11 protocol. In some embodiments, an AP includes at least one antenna, at least one transceiver operably connected to the at least one antenna, and at least one controller operably connected to the corresponding transceiver. In some embodiments, the least one transceiver includes a physical layer (PHY) device. The at least one controller operably may be configured to control the at least one transceiver to process received packets through the at least one antenna. In some embodiments, the at least one controller is implemented within a processor, such as a microcontroller, a host processor, a host, a digital signal processor (DSP), or a central processing unit (CPU), which can be integrated in a corresponding transceiver. Each of the APs 110-1, 110-2, 110-3 of the AP MLD may operate in a different frequency band. For example, the AP 110-1 may operate in 2.4 gigahertz (GHz) frequency band, the AP 110-2 may operate in 5 GHz frequency band, and the AP 110-3 may operate in 6 GHz frequency band. In the embodiment depicted in FIG. 1, the AP MLD is connected to a distribution system (DS) 106 through a distribution system medium (DSM) 108. The distribution system (DS) 106 may be a wired network or a wireless network that is connected to a backbone network such as the Internet. The DSM 108 may be a wired medium (e.g., Ethernet cables, telephone network cables, or fiber optic cables) or a wireless medium (e.g., infrared, broadcast radio, cellular radio, or microwaves). Although the AP MLD 102 is shown in FIG. 1 as including three APs, other embodiments of the AP MLD 102 may include fewer than three APs or more than three APs. In addition, although some examples of the DSM 108 are described, the DSM 108 is not limited to the examples described herein.

In the embodiment depicted in FIG. 1, the non-AP MLD 104-1 includes multiple non-AP stations (STAs) 120-1, 120-2, 120-3, and one common entity 121. The STAs implement the features related to the specific links, e.g., medium access and frame transmission/reception. The common entity 121 includes the features shared by all links (STAs), e.g., association state maintenance with the AP MLD 102 and reordering of the received data frames before transmitting them to the up layer. The STAs 120-1, 120-2, 120-3 may be implemented in hardware (e.g., circuits), software, firmware, or a combination thereof. The STAs 120-1, 120-2, 120-3 may be fully or partially implemented as an IC device. In some embodiments, the non-AP STAs 120-1, 120-2, 120-3 are wireless devices that wirelessly connect to wireless APs affiliated with an AP MLD. For example, the non-AP MLD 104-1 including the non-AP STAs 120-1, 120-2, 120-3 may be a laptop, a desktop personal computer (PC), a mobile phone, or other wireless device that supports at least one WLAN communications protocol. In some embodiments, the non-AP STAs 120-1, 120-2, 120-3 are wireless devices compatible with at least one IEEE 802.11 protocol (e.g., an IEEE 802.11be protocol).

In some embodiments, the non-AP MLD has one Media Access Control (MAC) data service interface. In an embodiment, a single address is associated with the MAC data service interface and is used to communicate on the DSM 108. In some embodiments, the AP MLD 102 and/or the non-AP MLDs 104-1, 104-2, 104-3 identify which communications links support the multi-link operation during a multi-link operation setup phase and/or exchanges information regarding multi-link capabilities during the multi-link operation setup phase. Each of the non-AP STAs 120-1, 120-2, 120-3 of the non-AP MLD may operate in a different frequency band. For example, the non-AP STA 120-1 may operate in 2.4 GHz frequency band, the non-AP STA 120-2 may operate in 5 GHz frequency band, and the non-AP STA 120-3 may operate in 6 GHz frequency band. Each of the non-AP MLDs 104-2, 104-3 may be the same as or similar to the non-AP MLD 104-1. For example, the non-AP MLD 104-2 or 104-3 includes multiple non-AP STAs. In some embodiments, each STA includes at least one antenna, at least one transceiver operably connected to the at least one antenna, and at least one controller connected to the corresponding transceiver. In some embodiments, the at least one transceiver includes a PHY device. The at least one controller operably may be configured to control the at least one transceiver to process received packets through the at least one antenna. In some embodiments, the at least one controller is implemented within a processor, such as a microcontroller, a host processor, a host, a DSP, or a CPU, which can be integrated in a corresponding transceiver.

In the embodiment depicted in FIG. 1, the non-AP MLD 104-1, 104-2, or 104-3 communicates with the AP MLD 102 through multiple communications links 112-1, 112-2, 112-3. For example, each of the non-AP STAs 120-1, 120-2, 120-3 communicates with an AP 110-1, 110-2, or 110-3 through a corresponding communications link 112-1, 112-2, or 112-3. Although the non-AP MLD 104-1 is shown in FIG. 1 as including three non-AP STAs, other embodiments of the non-AP MLD 104-1 may include fewer than three non-AP STAs or more than three non-AP STAs. In addition, although the AP MLD 102 communicates (e.g., wirelessly communicates) with the non-AP MLDs 104-1, 104-2, 104-3 through multiple links 112-1, 112-2, 112-3, in other embodiments, the AP MLD 102 may communicate (e.g., wirelessly communicates) with the non-AP MLDs through more than three communications links or less three than communications links.

For operations in the multi-link communications system 100, frames are exchanged between MLDs in the system, such as the AP MLD 102 and the non-AP MLDs 104. Some of these operations may involve more than one of the multiple links 112. As explained in detail below, the multi-link communications system 100 is designed so that a single frame exchange on one of the multiple links 112 between MLDs can be used to execute a multi-link operation for a plurality of links, rather than multiple frame exchanges for the plurality of links to execute the multi-link operation for the plurality of links. As used herein, a single frame exchange may involve a single transmission of a frame from a first MLD in the multi-link communications system to a second MLD in the multi-link communications system. In some cases, a single frame exchange may only involve a transmission of a frame from the first MLD to the second MLD. In other cases, a single frame exchange may involve a transmission of a request frame from the first MLD to the second MLD and another transmission of a response frame from the second MLD back to the first MLD. In some cases, the single frame exchange may further include, after the transmission of the response frame, a transmission of a confirmation frame from the first MLD to the second MLD. In some cases, the single frame exchange may include four handshakings.

Figure 2:
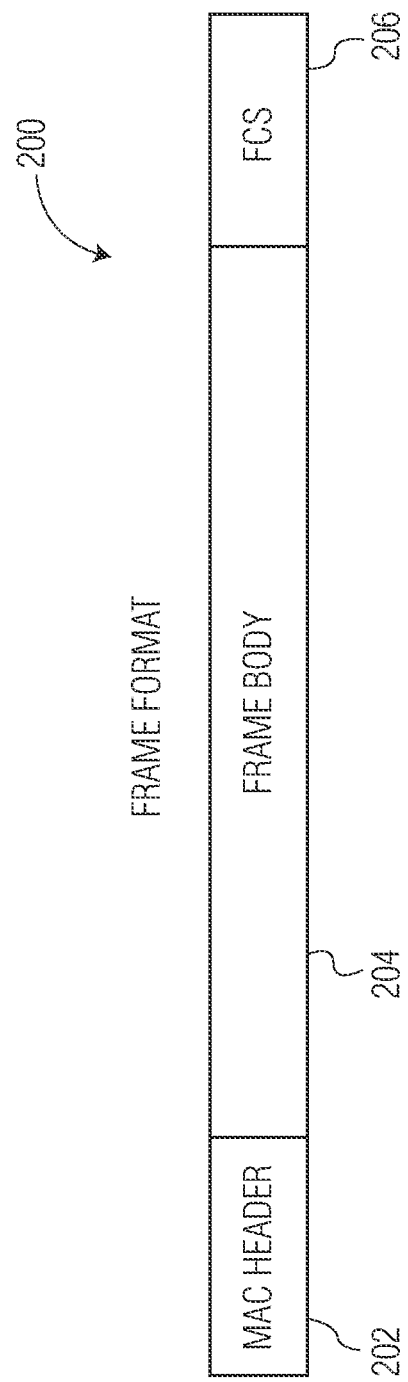
FIG. 2 shows a frame format used in the multi-link communications system in accordance with an embodiment of the invention.

The frames that are used to execute multi-link operations for multiple links in the multi-link communications system 100 may be any type of frames. The format of a frame 200 that can be used to execute multi-link operations for multiple links in the multi-link communications system in accordance with embodiments of the invention is illustrated FIG. 2. As shown in FIG. 2, the frame 200 includes a Media Access Control (MAC) header 202, a frame body 204 and a frame check sequence (FCS) 206. The MAC header 202 and the FCS 206 are well known parts of data frames for communication, and thus, are not described herein in detail. The frame body 204 includes information regarding a multi-link operation being executed and links that are involved in the multi-link operation. The frame body 204 includes one or more elements to carry the information. The elements that may be included in the frame body 204 are described below.

Figure 3:
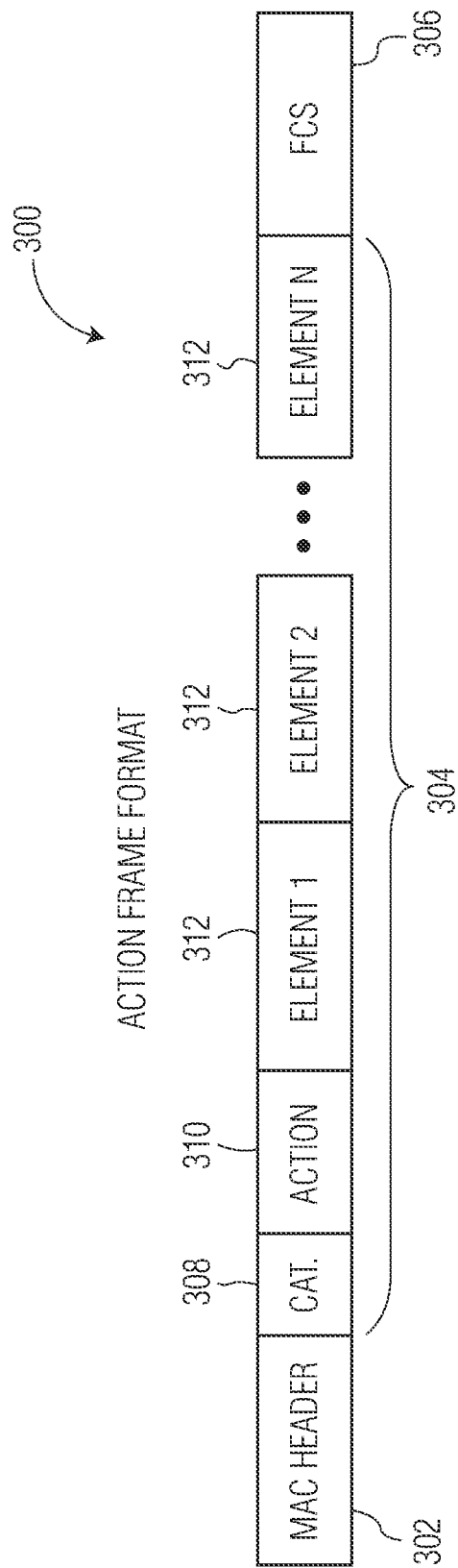
FIG. 3 shows an action frame format used in the multi-link communications system in accordance with an embodiment of the invention.

The frames that can be used to execute multi-link operations for links in the multi-link communications system 100 include, but not limited to, probe request/response frames, association request/response frames, beacon frames and action frames, which may include fields and elements. As an example, the format of an action frame 300 that can be used to execute multi-link operations for multiple links in the multi-link communications system in accordance with embodiments of the invention is illustrated FIG. 3. As shown in FIG. 3, the frame 300 includes a MAC header 302, a frame body 304 and a frame check sequence (FCS) 306. The frame body 304 includes a category field 308, an action field 310 and a number of elements 312. The category field 308 indicates the action frame type for the action frame 300 and the action field 310 indicates the action to be performed. The elements 312 carry various information for the action frame, including additional information of the action being executed and the links that are involved in the action.

Figure 4:
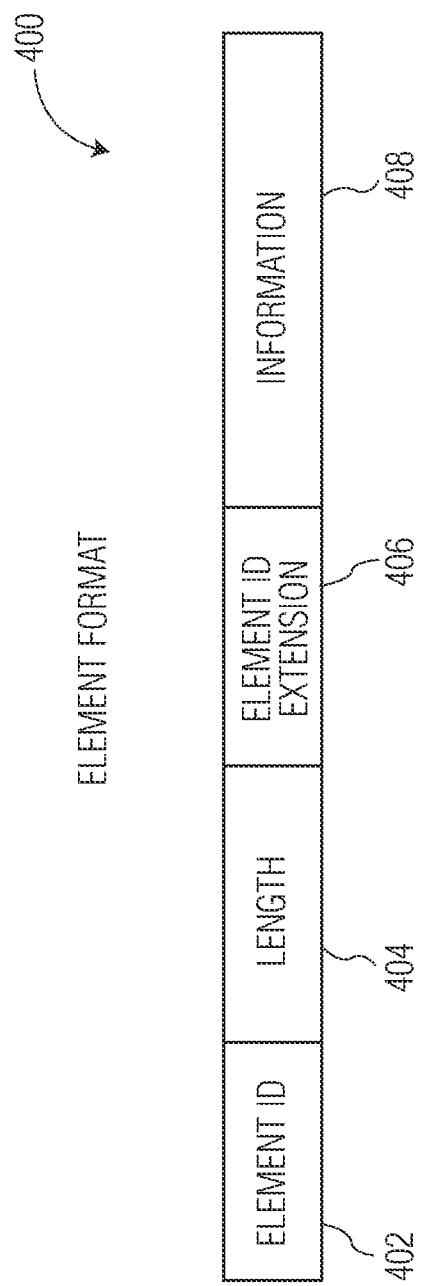
FIG. 4 shows an element format used in the multi-link communications system in accordance with an embodiment of the invention.

Turning now to FIG. 4, a generic format of an element 400 that can be used in the multi-link communications system 100 in accordance with an embodiment of the invention is illustrated. As shown in FIG. 4, the element 400 includes an element identifier (ID) 402, a length field 404, an element ID extension 406 and an information field 408. The element ID 402 identifies the element. The length field 404 carries information regarding the length of the element. The element ID extension 406 indicates whether the element is extensible or not. The information field 408 is used to carry the payload of information.

There are different types of elements in the frames used to execute the multi-link operations in the multi-link communications system 100. These different types of elements include (1) non-extensible elements, (2) extensible elements where new fields can be added, and (3) extensible elements where new subelements can be added.

If the element 400 is extensible through new fields, a new field 520 with one or more link identifiers (IDs) or link bitmaps can be added to the element 400 in accordance with an embodiment of the invention, as illustrated in FIG. 5A. This element 400 with the new added field 520, which is transmitted in one link, is a related element of one or more other links for a multi-link operation, which are identified by the link identifiers or link bitmaps. The element 400 with the new added field 520 may include capabilities, operating parameters and/or negotiation parameters of the other link(s) in the new added field 520. For example, the Extremely High Throughput (EHT) Capabilities element, the Very High Throughput (VHT) Operation element, Wide Bandwidth Channel Switch etc. are extensible elements. In some implementations, a new field may be added for each other link involved in the multi-link operation.

Figure 5B:
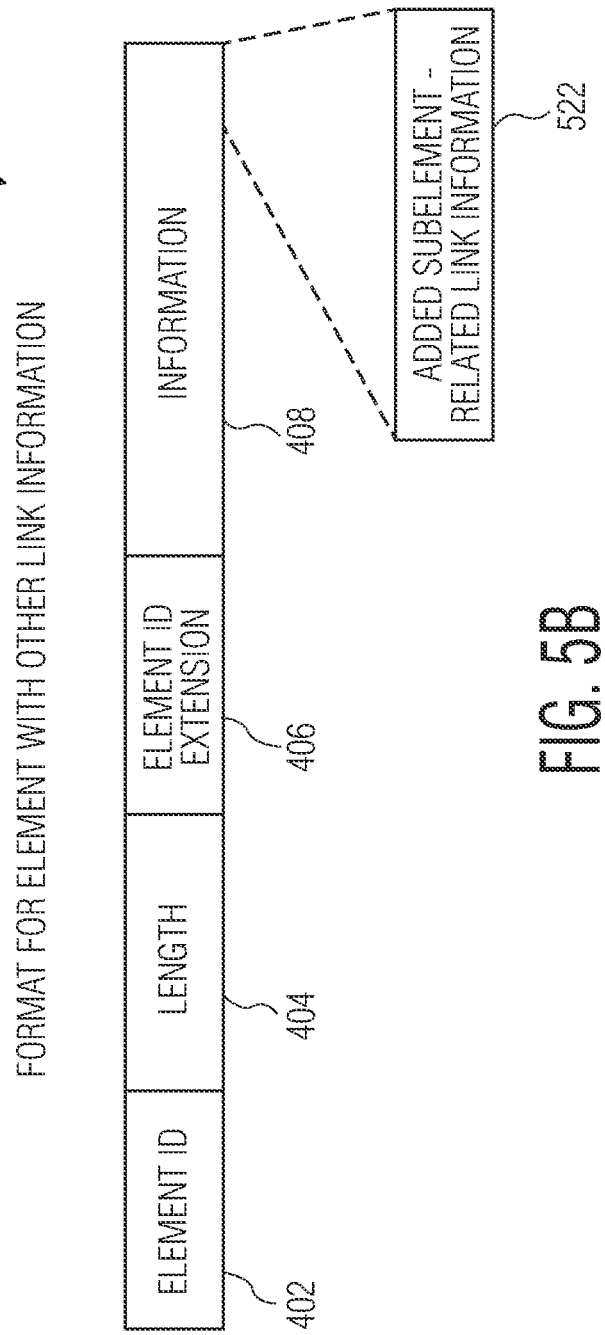
FIG. 5B shows a format for an element with other link information used in the multi-link communications system in accordance with another embodiment of the invention.

If the element 400 is extensible through new subelements, a new subelement 522 with one or more link identifiers or link bitmaps can be added to the element 400 in accordance with an embodiment of the invention, as illustrated in FIG. 5B. This element 400 with the new added subelement 522, which is transmitted in one link, is a related element of one or more other links for a multi-link operation, which are identified by the link identifiers or link bitmaps. The element 400 with the new added subelement 522 may include capabilities, operating parameters and/or negotiation parameters of the other link(s). In some implementations, a new subelement may be added for each other link involved in the multi-link operation.

If the element 400 is not extensible, a new element 524 can be defined where the new element includes the content of original inextensible element 400 and other link information, i.e., information regarding one or more other links involved in a multi-link operation. The new element 524 includes an element identifier (ID) 526, a length field 528, an element ID extension 530 and an information field 532, which includes the original information 408 of the element 400 and related link information 534. The related link information 534 includes a link identifier or a link bitmap for each of the other links and capabilities, operating parameters and/or negotiation parameters of the other link(s).

In another embodiment, the information of multiple elements (examples of the elements are EDCA Parameter element, HE/EHT Operation element, HE/EHT Capabilities element) of the other links can be encapsulated in a Per STA Profile element. This Per STA Profile element, which is transmitted in one link, is a related element of one or more other links that carries multiple subelements for different kind of information. The Per STA Profile element may include a link identifier or a link bitmap for each of the other links and capabilities, operating parameters and/or negotiation parameters of the other link(s).

Figure 6:
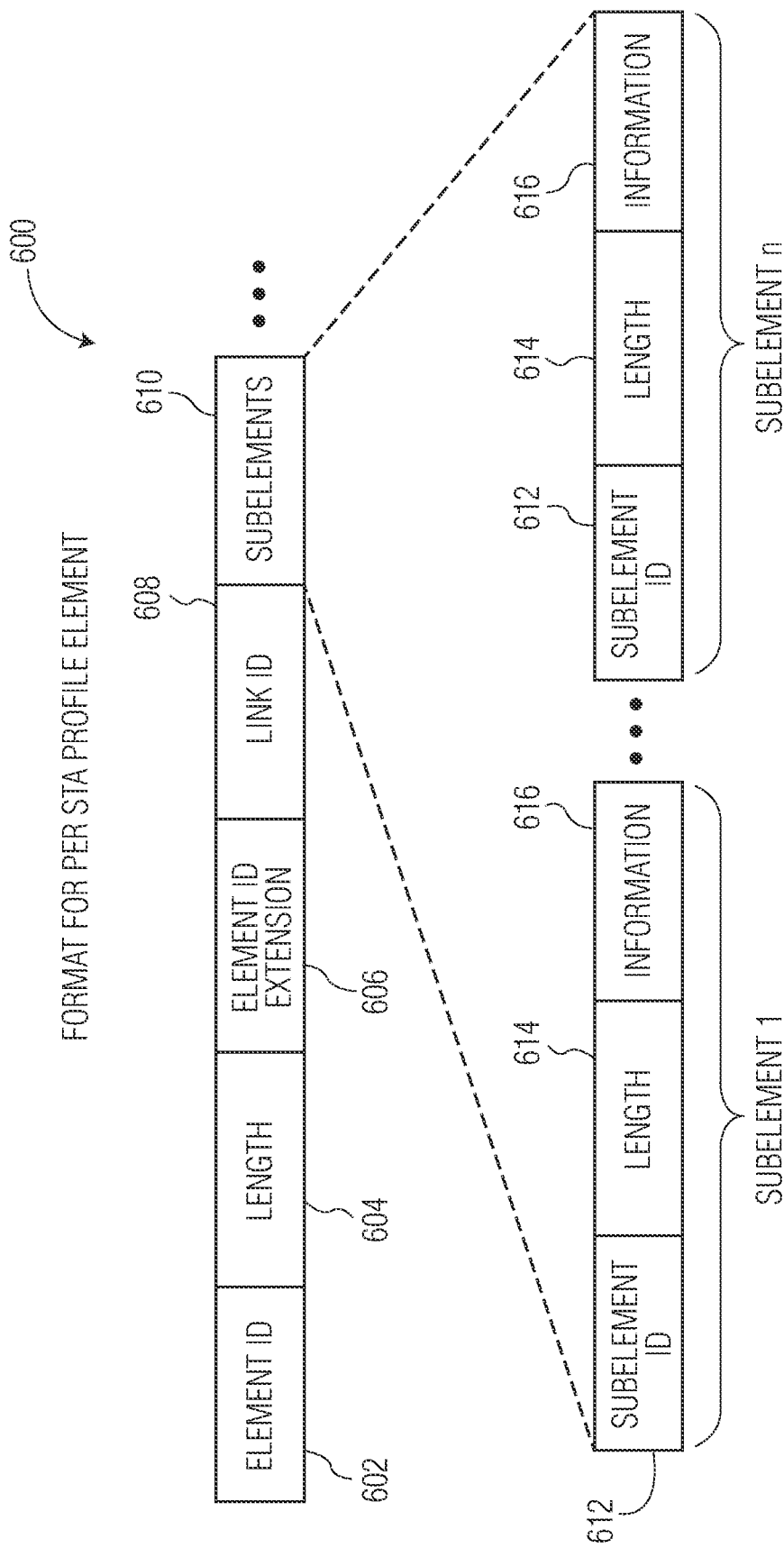
FIG. 6 shows a format for a Per STA Profile element with other link information used in the multi-link communications system in accordance with another embodiment of the invention.

The format of a Per STA Profile element 600 in accordance with an embodiment of the invention is illustrated in FIG. 6. As shown in FIG. 6, the Per STA Profile element 600 includes an element ID 602, a length field 604, an element ID extension 606, a Link ID field 608, and one or more subelements 610. Each subelement 610 includes a subelement ID 612, a length field 614, and an information field 616. The information fields 616 in the subelements 616 include capabilities, operating parameters and/or negotiation parameters of the link. Thus, the Per STA Profile element 600 includes the link information of other link and capabilities, operating parameters and/or negotiation parameters of the other link.

Figure 5C:
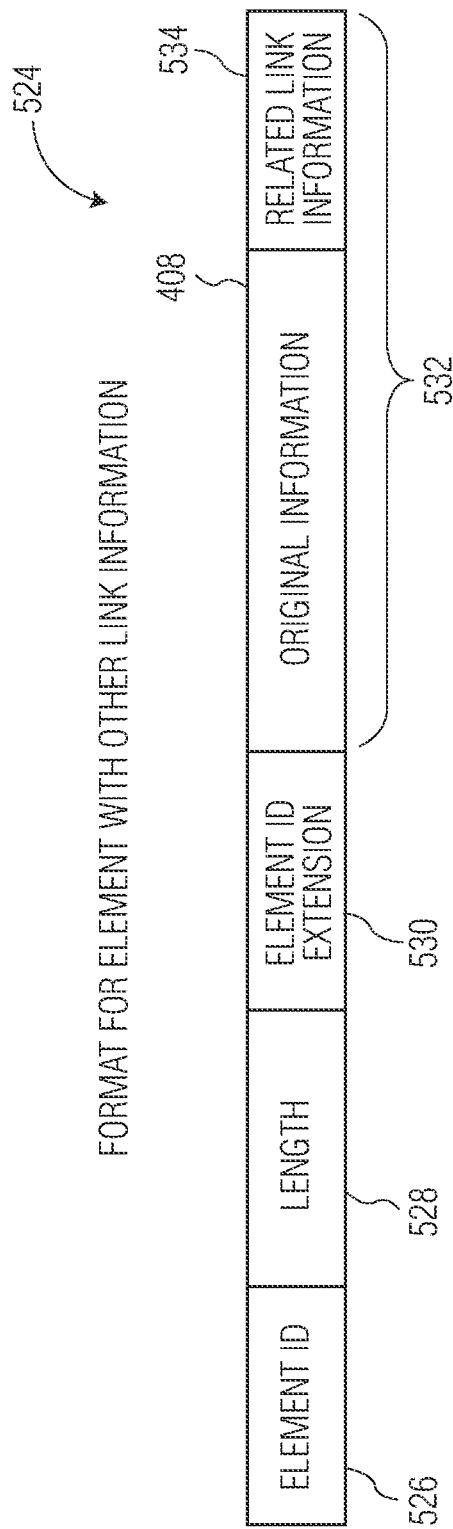
FIG. 5C shows a format for an element with other link information used in the multi-link communications system in accordance with another embodiment of the invention.

Using an element with other link information, as illustrated in FIGS. 5A-5C or a Per STA Profile element 600, as illustrated in FIG. 6, one or more frames can be used to execute a multi-link operation with a single frame exchange between MLDs in the multi-link communication system 100. However, for certain multi-link operations involving multiple links, there may be information that need to be included in such a frame that is different from the information involved in the other multi-link operation. As an example, the information in Beacon, Association Request/Response, Probe Request/Response for the transmitting link and other links may be different from the Probe Request/Response transmitted in one link to only carry the information of other links. As an example, the information in Beacon, Association Request/Response, Probe Request/Response for multiple links may be different from the Action frames for multiple link operation. In an embodiment, the Per STA Profile element may include a type field that identifies one of different formats for the Per STA Profile element. In some cases, the information for specific links may include the information that cannot be carried in any subelements of Per STA Profile element. This type of information will be referred to herein as "per-link value information." In some cases, this type of information is different when the Type field has different values.

Figure 7:
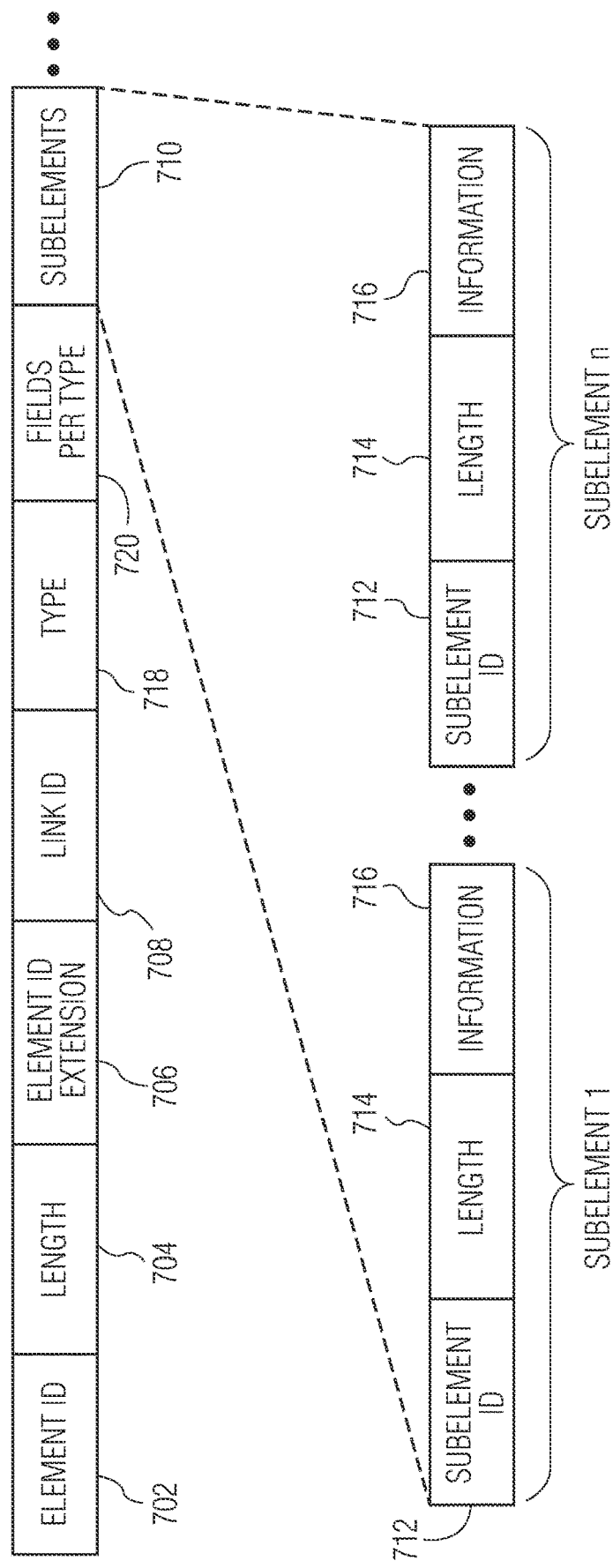
FIG. 7 shows a format for a Per STA Profile element with per-link value information used in the multi-link communications system in accordance with another embodiment of the invention.

In another embodiment, as illustrated in FIG. 7, the Per STA Profile element 700 includes a type field 718 and a fields per type 720, in addition to an element ID 702, a length field 704, an element ID extension 706, a link ID field 708, and one or more subelements 710. The fields per type 720 include different fields based on the different values in type field. In another embodiment, the fields per type 720 includes a bitmap field to indicate whether the other fields in fields per type 720 (e.g., timestamp, beacon interval, capability information, and listen interval) exist or not for the same type value. The different values in the type field of a Per STA Profile element define the different subelements being carried in the Per STA Profile element. Each subelement 710 includes a subelement ID 712, a length field 714, and an information field 716. Each subelement ID field 712 identifies the management information that is carried in the respective Information 716. Each Length field 714 indicates the length of the respective subelement. As an example, the EDCA parameter subelement, HE Operation subelement, EHT Operation subelement will be respective subelements carried in one Per STA Profile element.

In an alternative embodiment, the Per STA Profile element 700 does not include the type field 712. In this embodiment, frame type/subtype, action category and action field, if they exist, define the per field per management frame ID.

Figure 8:
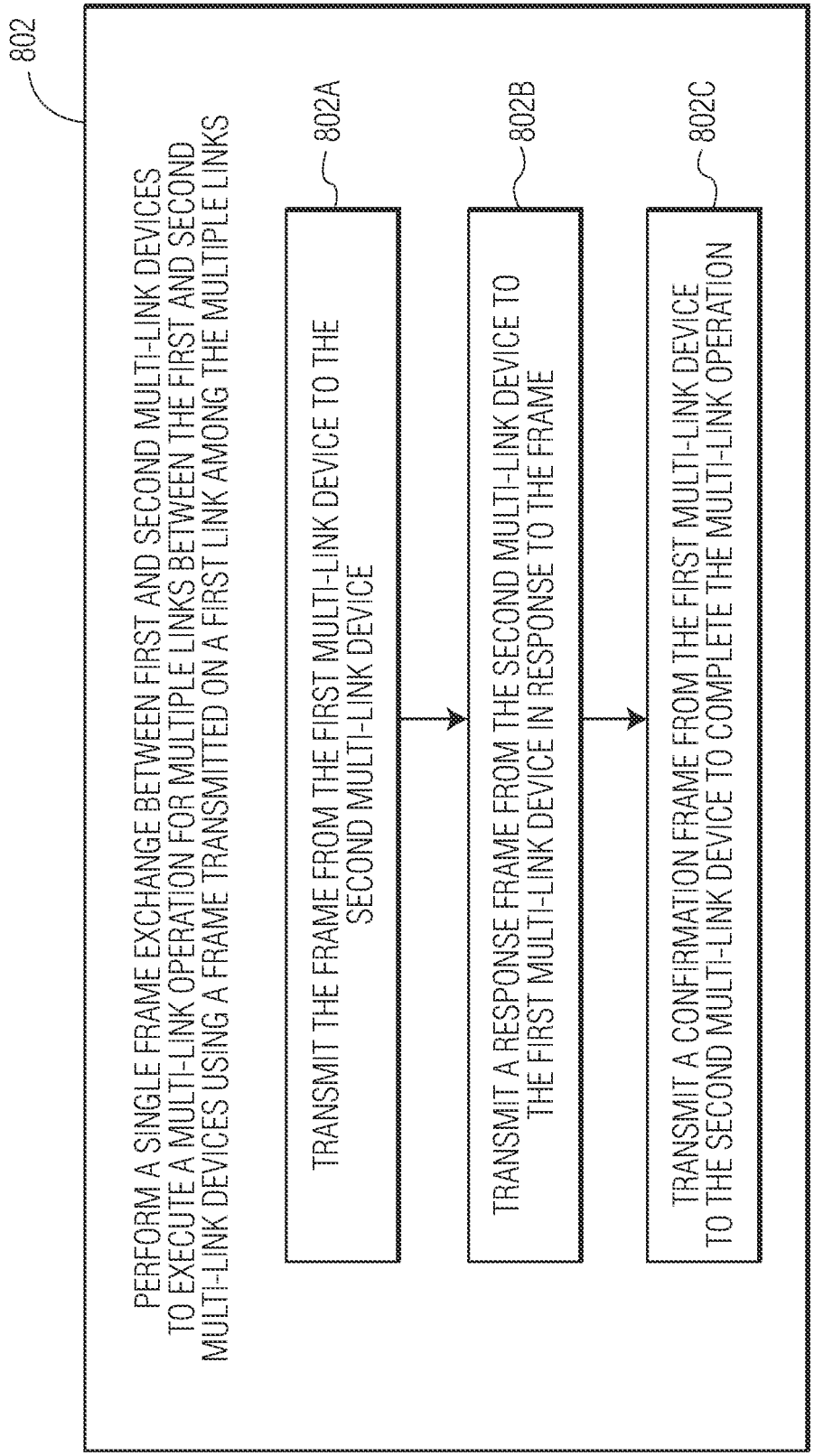
FIG. 8 illustrates a flow diagram of a process of executing multi-link operations for multiple links in a multi-link communications system in accordance with an embodiment of the invention.

A process of executing multi-link operations for multiple links in the multi-link communications system 100 in accordance with embodiments of the invention is now described with reference to a flow diagram of FIG. 8. The process includes a step 802, where a single frame exchange is performed between a first multi-link device in the multi-link communications system and a second multi-link device in the multi-link communications system to execute a multi-link operation for multiple links between the first and second multi-link device using a frame transmitted on a first link among the multiple links, where the frame includes an element that carries other link information on at least one link of the multiple links other than the first link and where the frame includes per-link information that has different values for different links of the multiple links. The successful execution of the single frame exchange completes the multi-link operation for at least two links of the multiple links between the first and second multi-link devices. The first and second multi-link devices may be AP MLDs, such as the AP MLD 102 in the multi-link communications system 100, or non-AP MLDs, such as the non-AP MLDs 104 in the multi-link communications system 100, As shown in FIG. 8, the step 802 includes a substep 802A, where the frame is transmitted from the first multi-link device to the second multi-link device. As described below, in some embodiments, the transmitted frame may be a request frame, a negotiation initiation frame or an announcement frame. In some embodiments, the step 802 further includes a substep 802B, where a response frame is transmitted back from the second multi-link device to the first multi-link device in response to the frame. In some embodiments, the step 802 may further include a substep 802C, where a confirmation frame is transmitted from the first multi-link device to the second multi-link device to complete the multi-link operation.

One of the multi-link operations that can be executed using techniques described herein is security key negotiation. Using a frame with an element that include information on multiple links and with per-link value information that has different values for the multiple link, as described herein, one pairwise transient key (PTK) between an AP MLD and a non-AP STA MLD in the multi-link communications system 100 is negotiated for all links between the AP MLD and the non-AP STA MLD. In an embodiment, the security key negotiation derives keys, e.g., pairwise transient key (PTK), through pairwise master key (PMK) (or PMK R0, PMK R1 in FT), the transmitter's address (TA), the receiver's address (RA), nonce etc. As an example, PTK may be calculated for over-the air fast basic service set (BSS) transition (FT) using the following equation:

$$PTK=KDF\text{-}Hash\text{-}Length(PMK\text{-}R1,\text{``FT-PTK''},SNonce\|ANonce\|BSSID\|STA\text{-}ADDR).$$

For the security key calculation of FT and TDLS, the BSSID is replaced by the Media Access Control (MAC) service access point (SAP) address of AP MLD instead of BSSID and the STA's address is replaced the MAC SAP address of the STA MLD. The 802.11 baseline defines the rules about the fast BSS transition of STA1 from BSS1 established by AP1 to BSS2 established by AP2. In embodiments in accordance with the invention, STA's address, AP1's BSSID and AP2 BSSID (RA and TA in the frames for FT) are used for key calculation. When STA MLD1 does the fast BSS transition from multi-link BSS 1 established by AP MLD1 to multi-link BSS 2 established by AP MLD2, the MAC SAP address of STA MLD1, the MAC SAP address of AP MLD1, the MAC SAP address of AP MLD2 that are different from the RA and TA in the frames for FT are used for key calculation.

Figure 9:
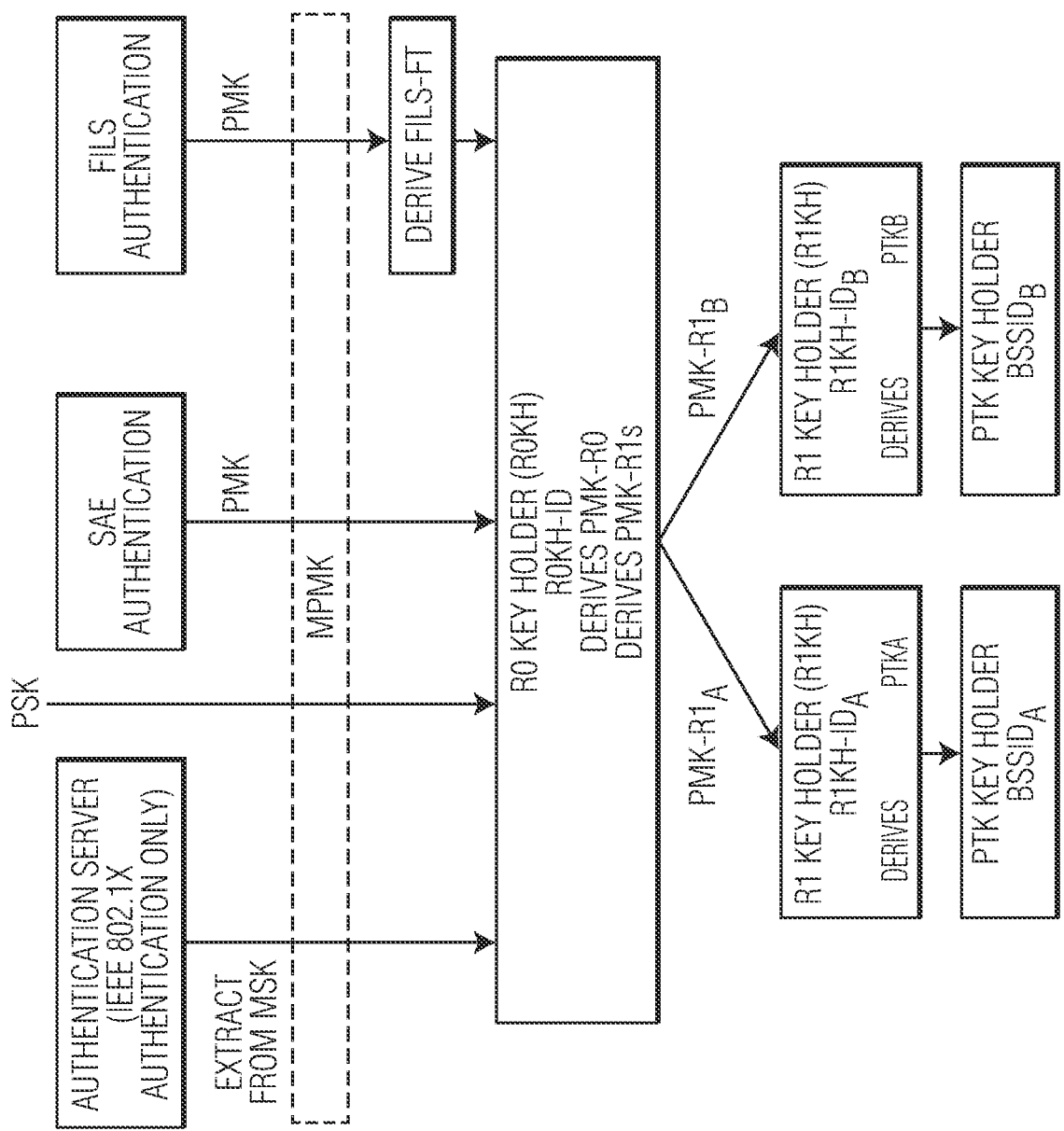
FIG. 9 illustrates a fast basic service set (BSS) transition (FT) key hierarchy for 802.11 baseline, which can be modified in accordance with an embodiment of the invention.

In some embodiments, key negotiations are based on different key hierarchies. For example, there is a key hierarchy for association and a key hierarchy for fast BSS transition. The key hierarchy for fast BSS transition (FT) as illustrated in FIG. 9 consists of three levels whose keys are derived using the key derivation function (KDF) as follows:
 a) PMK-R0—This is the first-level key of the FT key hierarchy. This key is derived as a function of the master session key (MSK), PMK, or PSK. It is stored by the PMK-R0 key holders, ROKH and S0KH.
 b) PMK-R1—This is the second-level key of the FT key hierarchy. This key is mutually derived by the S0KH and ROKH.
 c) PTK—This is the third-level key of the FT key hierarchy that defines the IEEE 802.11 and IEEE 802.1X protection keys. The PTK is mutually derived by the PMK-R1 key holders, R1KH and S1KH.

The key hierarchy for fast BSS transition as shown in FIG. 9 needs to do the following changes for MLD operation:
 a) The respective keys are for respective MLDs.
 b) The addresses are replaced by MAC SAP addresses of related MLDs: S1KH-ID and S0KH-ID are replaced by non-AP MLD address; R1KH-ID is replaced by AP MLD address; $BSSID_A$ is replaced by MAC SAP address of AP $MLD_A$, and $BSSID_B$ is replaced by MAC SAP address of AP $MLD_B$).

Other multi-link operations that can be executed using techniques described herein include tunneled direct link setup (TDLS) establishment for two non-AP MLDs to communicate with each other directly, and TDLS teardown. Thus, using a frame with an element that include information on multiple links and with per-link value information that has different values for the multiple link, as described herein, a single frame exchange can be used for TDLS establishment or for TDLS teardown.

The TDLS establishment and teardown involve link addresses and SAP addresses of the non-AP MLDs. The SAP address of a non-AP MLD may be same as one of its link addresses or may be different from all its link addresses. With respect to link addresses of non-AP MLDs, in a first embodiment, each non-AP MLD may have different link address in different links, i.e., a unique link address in each of the links. In this embodiment, each non-AP MLD may also have one SAP address. In a second embodiment, each non-AP MLD has the same MAC address in all its links. In a third embodiment, the TDLS initiator, which transmits a TDLS request frame, has different link addresses in different links. In addition, the TDLS responder, which transmits a TDLS response frame, has the same link address in all its links.

The TDLS establishment process in accordance with an embodiment of the invention is executed using a single frame exchange, which involves transmitting a TDLS setup request frame from a first non-AP MLD in the multi-link communications system 100, e.g., the non-AP MLD 104-1, to a second non-AP MLD in the multi-link communications system 100, e.g., the non-AP MLD 104-2, transmitting a TDLS response frame from the second non-AP MLD to the first non-AP MLD, and transmitting a confirmation frame from the first non-AP MLD to the second non-AP MLD. The capacities and operation parameters of links other than the link, on which the TDLS request is transmitted, response and confirmation frames are transmitted, can be carried in at least some of these frames in the manner described herein.

In some embodiments, multiple TDLS links share the same PTK and packet number (PN). In these embodiments, MAC_I and MAC_R in calculating PTK are the SAP address of the TDLS initiating non-AP MLD and the SAP of the TDLS responding non-AP MLD, respectively.

In some embodiments, the frames from one traffic ID (TID) can be transmitted in multiple links. The BA operation defined in a basic service set (BSS) can be applied to TDLS links between two MLDs.

The TDLS teardown process in accordance with an embodiment of the invention is executed using a single frame exchange, which involves transmitting a TDLS teardown frame between two non-AP MLDs with multiple links. This process tears down multiple TDLS links between the two MLDs. The parameters of links other than the link, on which the TDLS request is transmitted, response and confirmation frames are transmitted, can be carried in the TDLS teardown frame in the manner described herein.

Other multi-link operations that can be executed using techniques described herein include multi-link power-saving mode (PSM) service period negotiations. In some embodiments, non-AP MLDs can negotiate the same periodic schedule periods for peer PSM operation of multiple links. The PSM parameters of the links that are different from the link used to transmit the peer PSM frames can be carried in the frames in the manner described herein. In other embodiments, non-AP MLDs can negotiate different periodic schedule periods for peer PSM operation of multiple links. In these embodiments, the PSM parameters of the links that are different from the link used to transmit the peer PSM frames can also be carried in the frames in the manner described herein.

In some embodiments, among multiple TDLS links between two TDLS non-AP MLDs, some links can be active links and other links can be peer PSM power save links. In these embodiments, the peer PSM negotiation frames of one link can be transmitted in the active link. There is no need for these frames to be transmitted through an AP.

Other multi-link operations that can be executed using techniques described herein include multi-link peer Unscheduled Automatic Power Save Delivery (U-APSD) negotiations. In some embodiments, the non-AP MLDs have separate U-APSD state in each TDLS link. In other embodiments, the non-AP MLDs have the same U-APSD state in all TDLS links.

In some embodiments, when negotiating TDLS U-APSD, the STAs affiliated with one MLD become TDLS peer U-APSD (TPU) buffer STAs (non-AP TPU buffer MLD), and the STAs affiliated with one MLD become TPU sleep STAs (non-AP TPU sleep MLD). In other embodiments, when negotiating TDLS U-APSD, some STAs affiliated with one MLD become TPU buffer STAs while other STAs affiliated with the MLD become TPU sleep STAs.

In some embodiments, the TDLS peer traffic indication being transmitted in one link can be used to notify the buffered frames in another link. In other embodiments, the TDLS peer traffic indication being transmitted in one link can be used to notify the buffered frames in that link only.

In some embodiments, among multiple TDLS links between two TDLS non-AP MLDs, some links can be active links and other links can be U-APSD power save links. In these embodiments, the TDLS peer traffic indication of one link can be transmitted in the active link. There is no need for the TDLS peer traffic indication to be transmitted through an AP.

There are some exceptions to the techniques described herein to execute multi-link operations for multiple links where the management frame for a link can only be transmitted in the link. The first exception is a multi-link operation involving management frames of sounding. Sounding feedback in compressed beamforming/channel quality indicator (CQI) frame can be solicited by beam forming report poll (BFRP) trigger frame, null data packet announcement (NDPA) and null data packet (NDP) frame, or beamforming report poll. The frame size of sounding feedback is relatively large and the sounding feedback is acquired by PHY layer, and it has lower chance that a multi-link entity has sounding feedback of multiple links simultaneously. Thus, the sounding feedback for one link can only be transmitted in one link. The transmission of sounding feedback for multiple links in one frame is not supported. Additionally, the sounding feedback of one link is transmitted in that link only.

The second exception is a multi-link operation involving management frames of fast session transfer (FST). FST is used for switching some traffic stream or all traffic streams from one link to another link.

The third exception is a multi-link operation involving management frames of public action. Public action frames are mainly used for the communication with overlapping basic service set (OBSS) STAs/APs. For fine time measurement (FTM), which is one of public action frames, it is not required to support multi-link measurement. The measurement result which is based on the long training preamble (LTF) measurement in one link should be transmitted in the link only.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method of executing multi-link operations in a multi-link communications system, the method comprising:
performing a single frame exchange between a first multi-link device and a second multi-link device to execute a multi-link operation for multiple links between the first and second multi-link devices using a frame transmitted on a first link among the multiple links,
wherein the frame includes an element that carries other link information on each of the multiple links other than the first link that are involved in the multi-link operation,
wherein the frame includes per-link value information that has different values for different links of the multiple link, the per-link value information including information that cannot be carried in any subelements of Per Station (STA) Profile element, and
wherein successful execution of the single frame exchange completes the multi-link operation for at least two links of the multiple links between the first and second multi-link devices.

2. The method of claim 1, wherein the other link information carried in the element includes link identifier of the at least one link of the multiple links other than the first link.

3. The method of claim 2, wherein the element is an extensible element and wherein the other link information is carried in at least one added field or subelement of the element.

4. The method of claim 2, wherein the element is a Per STA Profile element that includes the other link information.

5. The method of claim 4, wherein the Per STA Profile element includes multiple subelements and fields before the multiple subelements.

6. The method of claim 4, wherein the Per STA Profile element has a particular format among different formats based on different values in a type field.

7. The method of claim 4, wherein the Per STA Profile element includes a type field that identifies one of different formats for the Per STA Profile element.

8. The method of claim 1, wherein the multi-link operation is a key negotiation of a fast basic service set (BSS) transition.

9. The method of claim 8, wherein the key negotiation is based on a key hierarchy for fast BSS transition.

10. The method of claim 8, wherein the key negotiation includes a pairwise transient key (PTK) negotiation based on a non-access point's media access control (MAC) service access point (SAP) address, a MAC SAP address of a current associated access point (AP) multi-link device and a MAC SAP address of a transmitting AP MLD.

11. The method of claim 1, wherein the single frame exchange excludes frame exchanges involving management frames of sounding, fast session transfer (FST) and public action.

12. A multi-link communications system comprising:
a first multi-link device;
a second multi-link device; and
a plurality of links connecting the first and second multi-link devices,
wherein the first and second multi-link devices are programmed to perform a single frame exchange to execute a multi-link operation for multiple links between the first and second multi-link devices using a frame transmitted on a first link among the multiple links,
wherein the frame includes an element that carries other link information on each of the multiple links other than the first link that are involved in the multi-link operation,
wherein the frame includes per-link value information that has different values for different links of the multiple link, the per-link value information including information that cannot be carried in any subelements of Per STA Profile element, and
wherein successful execution of the single frame exchange completes the multi-link operation for at least two links of the multiple links between the first and second multi-link devices.

13. The multi-link communications system of claim 12, wherein the other link information carried in the element includes link identifier of the at least one link of the multiple links other than the first link.

14. The multi-link communications system of claim 13, wherein the element is an extensible element and wherein the other link information is carried in at least one added field or subelement of the element.

15. The multi-link communications system of claim 12, wherein the element is a Per STA Profile element that includes the other link information.

16. The multi-link communications system of claim 15, wherein the Per STA Profile element has a particular format among different formats based on a management frame that carriers the Per STAT Profile element or wherein the Per STA Profile element includes a type field that identifies one of the different formats for the Per STA Profile element.

17. The multi-link communications system of claim 12, wherein the multi-link operation is a key negotiation of a fast basic service set (BSS) transition.

18. A multi-link device of a multi-link communications system, the multi-link device comprising:

a processor configured to:
- perform a single frame exchange with another multi-link device of the multi-link communications system to execute a multi-link operation for multiple links between the multi-link device and the another multi-link device using a frame transmitted on a first link among the multiple links,
- wherein the frame includes an element that carries other link information on each of the multiple links other than the first link that are involved in the multi-link operation,
- wherein the frame includes per-link value information that has different values for different links of the multiple link, the per-link value information including information that cannot be carried in any subelements of Per STA Profile element, and
- wherein successful execution of the single frame exchange completes the multi-link operation for at least two links of the multiple links between the multi-link device and the another multi-link device.

19. The multi-link device of claim 18, wherein the other link information carried in the element includes link identifier of the at least one link of the multiple links other than the first link.

20. The multi-link device of claim 19, wherein the element is a Per STA Profile element that includes the other link information, and wherein the Per STA Profile element has a particular format among different formats based on a management frame that carriers the Per STAT Profile element or wherein the Per STA Profile element includes a type field that identifies one of the different formats for the Per STA Profile element.

* * * * *